(12) United States Patent
Belschner et al.

(10) Patent No.: US 8,088,532 B2
(45) Date of Patent: Jan. 3, 2012

(54) MONITORING APPARATUS FOR A FUEL CELL STACK

(75) Inventors: Werner Belschner, Michelbach a.d. Bilz (DE); Matthias Kugel, Stuttgart (DE); Juergen Leitz, Dettingen (DE); Ralf Mueller, Lobstaedt (DE); Juergen Hoermann, Aitrach (DE)

(73) Assignee: Daimler AG, Stuttgart (DE)

( * ) Notice: Subject to any disclaimer, the term of this patent is extended or adjusted under 35 U.S.C. 154(b) by 523 days.

(21) Appl. No.: 12/299,440

(22) PCT Filed: May 4, 2006

(86) PCT No.: PCT/EP2006/004165
§ 371 (c)(1),
(2), (4) Date: Apr. 7, 2009

(87) PCT Pub. No.: WO2007/128328
PCT Pub. Date: Nov. 15, 2007

(65) Prior Publication Data
US 2010/0009227 A1    Jan. 14, 2010

(51) Int. Cl.
*H01M 8/04* (2006.01)
(52) U.S. Cl. ............................................. 429/446
(58) Field of Classification Search ............ 429/428, 429/432, 442, 446
See application file for complete search history.

(56) References Cited

U.S. PATENT DOCUMENTS

| | | | |
|---|---|---|---|
| 6,746,250 B2 | 6/2004 | Blutbacher | |
| 7,487,851 B2 * | 2/2009 | Buck et al. | 180/65.265 |
| 2004/0034460 A1 | 2/2004 | Folkerts et al. | |
| 2004/0058586 A1 * | 3/2004 | Blutbacher | 439/660 |
| 2004/0081867 A1 * | 4/2004 | Edlund | 429/22 |
| 2004/0081868 A1 * | 4/2004 | Edlund | 429/22 |
| 2006/0055246 A1 | 3/2006 | Jansen et al. | |
| 2006/0102397 A1 | 5/2006 | Buck et al. | |
| 2008/0138677 A1 * | 6/2008 | Edlund | 429/17 |

FOREIGN PATENT DOCUMENTS

| | | |
|---|---|---|
| DE | 199 50 008 A1 | 4/2001 |
| DE | 100 49 196 A1 | 4/2002 |
| DE | 102 33 821 A1 | 2/2004 |
| DE | 103 36 743 A1 | 3/2004 |
| DE | 10 2004 008 869 A1 | 9/2004 |
| WO | WO 2004/038845 A1 | 5/2004 |

OTHER PUBLICATIONS

International Search Report dated Dec. 22, 2009 (Form PCT/ISA/210) with partial English translation, including Form PCT/ISA/220 (Eight (8) pages).
Written Report of the International Search Agency (Form PCT/ISA/237) with partial English translation (Eight (8) pages), Dec. 22, 2006.

* cited by examiner

*Primary Examiner* — Javaid Nasri
(74) *Attorney, Agent, or Firm* — Crowell & Moring LLP

(57) ABSTRACT

A control apparatus for a fuel cell stack having an operation control module is provided. The operation control module is configured in terms of programming and circuitry in order to control a large number of sensor or actuator systems that are relevant to normal operation. The sensor or actuator systems relate to the operating state of the fuel cell stack during normal operation and have a safety control module that is designed in terms of programming and circuitry to control safety-relevant sensor or actuator systems. The safety-relevant sensor or actuator systems relate to the safety functions of the fuel cell stack and the safety control module is in the form of an assembly which operates autonomously with respect to the operation control module. A method for controlling the fuel cell stack and the operation control module is also provided.

18 Claims, 1 Drawing Sheet

MONITORING APPARATUS FOR A FUEL CELL STACK

RELATED APPLICATION

This application is a National Stage Entry under 35 U.S.C. § 371 of International Application No. PCT/EP2006/004165, filed May 4, 2006. The disclosure of which is incorporated herein in its entirety.

FIELD OF THE INVENTION

In certain embodiments, the invention relates to a control apparatus for a fuel cell stack having an operations control module, wherein the operations control module is designed, in terms of program technology and/or circuit technology, to control a plurality of normal-operation-related sensor systems/actuator systems, wherein the normal-operation-related sensor systems/actuator systems relate to the operating state of the fuel cell stack during normal operation. A safety control module is also provided, wherein the safety control module is designed, in terms of program technology and/or circuit technology, to control safety-related sensor systems/actuator systems, wherein the safety-related sensor systems/actuator systems relate to the safety functions of the fuel cell stack.

BACKGROUND AND SUMMARY OF THE INVENTION

Fuel cell stacks constitute a promising future alternative for supplying power to vehicles in road traffic since by using fuel cell stacks it is possible to drastically reduce the environmental load, in particular by exhaust gases.

Such a fuel cell stack constitutes a complex technical system on which open-loop and/or closed-loop control has to be performed using suitable control apparatuses, and a large variety of control apparatuses for vehicles are known from the prior art.

For example, publication DE 10336743 A1 discloses an open-loop control system with a plurality of modules for a drive train of a vehicle, wherein the drive train optionally also comprises a fuel cell. In this open-loop control system it is proposed to provide a first module for integrating a drive train open-loop control and a second module for controlling the power generation and/or transmission, wherein the two modules can be programmed independently of one another.

Document DE 10 2004 008 869 A1 discloses a control unit and a computer program for controlling a drive unit of a vehicle. The control unit comprises a hardware platform on which the computer program runs, wherein a plurality of modules for implementing open-loop control functions, safety functions and/or monitoring functions for the drive unit of the vehicle are implemented in the computer program.

In one embodiment, the invention is based on the object of providing a control apparatus of the type mentioned at the beginning which assists reliable operation of a fuel cell stack in a vehicle.

This object is achieved by means of a control apparatus having an operations control module configured in terms of program technology and/or circuit technology, to control a plurality of normal-operation-related sensor systems or actuator systems, wherein the normal-operation-related sensor systems or actuator systems relate to the operating state of the fuel cell stack during normal operation, and a safety control module, wherein the safety control module is configured in terms of program technology and/or circuit technology to control safety-related sensor systems or actuator systems, wherein the safety-related sensor systems or actuator systems relate to the safety functions of the fuel cell stack, wherein the safety control module is provided as an assembly which operates in an autonomous fashion with respect to the operations control module. Preferred and/or advantageous embodiments are disclosed by the subclaims, the following description and/or the appended FIGURE.

The control apparatus according to the invention is designed and/or suitable for a fuel cell stack, preferably for use in a vehicle, and comprises at least one operations control module and at least one safety control module, wherein both control modules are respectively designed to control sensor systems/actuator systems in terms of program technology and/or circuit technology. The control of a sensor system/actuator system is effected, for example, if measurement signals in digital and/or analog form are transmitted to the control module via one or more sensor systems, the measurement signals are processed in the control module on the basis of an open-loop or closed-loop control, and an actuation signal is transmitted to the assigned actuator system, likewise in digital and/or analog form, as a result of the open-loop or closed-loop control.

For a clear architecture of the control apparatus, the controlled sensor systems/actuator systems are preferably divided into normal-operation-related sensor systems/actuator systems and into safety-related sensor systems/actuator systems. The normal-operation-related sensor systems/actuator systems relate here to the closed-loop or open-loop control of the fuel cell stack within the normal operating mode so that power generation which corresponds to the request, for example, is carried out by means of these sensor systems/actuator systems. These sensor systems/actuator systems ensure, for example, that a sufficient quantity of fuel and oxidant is supplied to the fuel cells, and that the temperature of the individual components of the fuel cell or of the fuel cell stack is optimized for the respective operating state.

The safety-related sensor systems/actuator systems ensure, in contrast, that the fuel cell stack does not go into an unacceptable operating state. An unacceptable operating state occurs, in particular, if there is a risk of damage to the fuel cells or to the fuel cell stack or to components which are connected to the fuel cell stack. Examples of such unacceptable operating states are, for example, pressures or temperatures in the fuel cell stack or components thereof which exceed a predefined safety limiting value.

According to certain embodiments of the invention, the safety control module is embodied as an assembly which operates in an autonomous fashion with respect to the operations control module.

In this embodiment according to the invention, the safety control module is capable of communicating with safety-related sensor systems/actuator systems and controlling them independently of the operations control module.

For this purpose, the safety control module may be embodied as hardware which is independent of the operations control module and which has, in particular, separate logic circuits and/or one or more separate processing units, in particular microprocessors, DSPs, ASICs, FPGAs or the like. In particular, the safety control module may be embodied as an embedded system with an operation system which runs only on the safety control module.

In certain embodiments, the invention is based on the idea of concentrating safety-related functions of the fuel cell stack in an electronic assembly which can carry out the safety-related functions independently of other functional assemblies or control modules. The safety control module is preferably embodied as a stand-alone system.

This ensures that in the case of disrupted or faulty communication with other control modules, the safety control module can implement the safety functions autonomously and/or independently.

A further advantage of certain embodiments of the invention is that the safety control module is relieved of the control, in particular of the closed-loop or open-loop control, of sensor systems/actuator systems which relate to the normal operating mode of the fuel cell stack. Since the control complexity for a fuel cell stack is enormous; owing to the large number of necessary components to operate a fuel cell stack, separating the safety functions in the safety control module also improves the reaction time and the speed when implementing the safety functions.

It is preferred that the safety control module is designed to control most or all of the safety-related sensor systems/actuator systems of the fuel cell stack. In this context, a gradual implementation of the invention occurs, with preferably all the safety functions being implemented in the safety control module. In less preferred embodiments, a small proportion of the safety functions can also be implemented in the operations control module. Within the scope of the invention it is also possible for a plurality of safety control modules to be used, in which case each safety control module is embodied as an autonomously operating assembly.

It is advantageous if the safety control module is designed to implement the safety functions even when the communication with other control modules, in particular with the operations control module, is disrupted or faulty. In one particularly preferred embodiment, the safety control module has a memory in which all the programs, data and/or parameters which are necessary for initialization are stored, so that when the safety control module starts there is no need for communication with other control modules. In alternative embodiments, the aforesaid programs, data and/or parameters are transferred from other control modules when the safety control module starts, in which case, after initialization, further communication with the other control modules is no longer necessary to operate the safety control module.

In one advantageous embodiment, the safety control module is an electronic safety system. The safety control module preferably comprises a watchdog system, an autonomous power supply system and/or an emergency power supply system and/or permits autonomous system-starting.

The safety control module preferably has interfaces for connecting the sensors and actuators of the safety-related sensor systems/actuator systems. It is possible for these interfaces to be embodied as a BUS interface, for example for a CAN bus. In this case, the safety control module is preferably embodied at the same time as a gateway, so that the BUS system for the sensors and actuators is designed to be independent of a further BUS system with which the safety control module communicates with other functional units or control modules.

Alternatively or additionally there is provision that the sensors and/or actuators are connected individually to the safety control module. The last-mentioned embodiment has the advantage that if one of the data lines between the safety control module and sensor system/actuator system fails, at least the remaining sensor systems/actuator systems can still be driven.

In one embodiment of the invention, the safety control module and the operations control module are embodied as part of a hierarchical control architecture.

In one embodiment, the uppermost hierarchy is formed by a central control unit which is designed to perform open-loop control of a mobile apparatus, in particular of a vehicle.

This central control unit is connected via a BUS system to, among other things, the operations control module. The central control unit and operations control module preferably form a master/slave combination, with the central control unit being embodied as the master. The BUS is, for example, implemented as a CAN BUS or SAE J 1850-BUS or BM-LAN.

The safety control module is either arranged at the master level or at the slave level, in which case at the master level it receives data, in particular operating parameters, from the central control unit, and transfers data, for example in the form of warning instructions, to the central control unit.

As an alternative to this embodiment, the safety control module may be arranged at the slave level, in which case it receives operating instructions from the central control unit.

In order to communicate and pass on data, in particular warning instructions, the safety control module is optionally provisioned to communicate, in particular, via a BUS system with the operations control module and/or the central control unit. As already mentioned above, it is, however, advantageous if the communication with the safety-related sensor systems/actuator systems occurs independently of the BUS system or the BUS systems between the safety control module and the operations control module and/or the central control unit.

BRIEF DESCRIPTION OF THE DRAWING

Further features, advantages and effects of the invention emerge from the following description of the FIGURE of an exemplary embodiment of the control apparatus according to the invention. In the drawing.

DETAILED DESCRIPTION OF THE DRAWING

Figure 1:
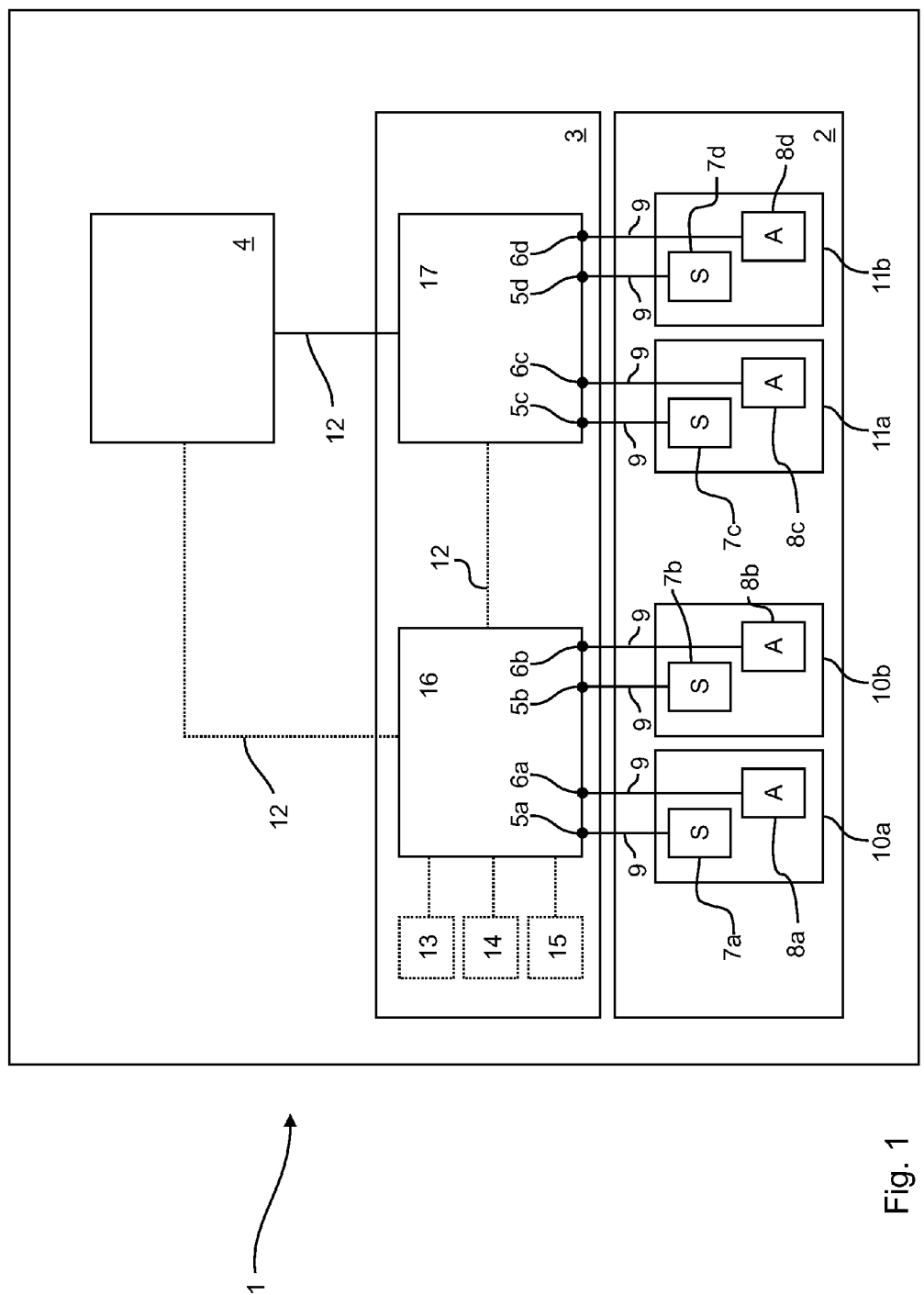
FIG. 1 shows a first exemplary embodiment of a control apparatus according to the invention in a block diagram.

FIG. 1 shows a schematic block diagram of a vehicle 1 in which a fuel cell stack 2, a control apparatus 3 and a central control unit 4 are illustrated and are connected to one another. The fuel cell stack 2 is, for example, a fuel cell of the PEM design. The central control unit 4 is embodied as a superordinate control unit for a plurality of functional assemblies in the vehicle 1.

Two separate assemblies are provided in the control apparatus 3, specifically an operations control module 17 and a safety control module 16. The safety control module 16 has two inputs 5a, 5b and two outputs 6a, 6b which are connected one-to-one to sensors 7a, 7b or actuators 8a, 8b via data lines 9. The data lines 9 may be separate digital data lines for the unidirectional or bidirectional transmission of data. Alternatively, analog signals are transmitted with the data lines 9 or with some of the data lines 9. It is also possible for sensor/actuator combinations which are associated with a common sensor system 10a/actuator system 10b to be supplied in terms of information technology by a common data line 9. The sensor systems 10a/actuator systems 10b are formed by a combination of sensors 7a and actuators 8a or 7b and 8b, respectively, wherein the components which are associated with a sensor system 10a/actuator system 10b form, together with the safety control module 16, an actuating circuit or a closed-loop control circuit In an analogous fashion, the operations control module 17 is connected to sensor systems 11a/actuator systems 11b.

The assignment of the sensor systems 10a/actuator systems 10b and sensor systems 11a/actuator systems 11b to the control module 16 or 17, respectively, is carried out on the basis of the function of the sensor systems 10a, 11a/actuator systems 10b, 11b. All safety-related sensor systems/actuator systems and/or sensor systems/actuator systems which support a safety function are assigned to the safety control module 16.

Examples of safety-related sensor systems 10a/actuator systems 10b are pressure sensor overpressure valve systems in hydraulic or pneumatic systems.

The central control unit 4 is connected via a communications line 12 to the operations control module 17, which is embodied, for example, as a BUS line, in particular as a CAN BUS. Optionally, data lines are provided between the operations control module 17 and safety control module 16 and/or between the central control unit 4 and safety control module 16.

In terms of the method of functioning, the operations control module 17 assumes all the closed-loop and/or open-loop control processes required for actuating the fuel cell stack 2. The operations control module 17 preferably receives information or requests relating to the above via the data line 12 from the central control unit 4. The central control unit 4 is connected, for example, via further data lines (not illustrated) to a sensor for sensing the pedal position of the vehicle 1, it senses the actual pedal position as a measured value and transfers a corresponding power request to the operations control module 17. This power request is then implemented by the operations control module 17 by means of the sensor systems 11a/actuator systems 11b, or further sensor systems/actuator systems.

The safety control module 16 is, on the other hand, exclusively responsible for monitoring and maintaining safety functions. In order to be able to ensure the functional capability of the safety control module 16 in every operating state, the safety control module is optionally embodied with an emergency power supply 13, a memory 14 of an operating system, data or parameters for operating the safety control module 16 and/or with a monitoring unit 15 which monitors the function of the safety control module 16 in the sense of a watchdog.

The illustrated architecture for the overall control of the vehicle 1 ensures, on the one hand, that in every operating state of the overall control apparatus the safety functions are maintained in all cases by the safety control module 16 since the safety control module 16 can perform these safety functions independently of the other functional modules. On the other hand, the operations control module 17 is relieved of these safety functions and can use its entire computing power to perform open-loop or closed-loop control of the fuel cell stack 2 in the normal operating state. The operations control module 17 and safety control module 16 are embodied here as two assemblies which operate autonomously from one another.

It is also possible to arrange these two assemblies on a common circuit board, however, in such a case it is necessary to ensure that the independent and/or autonomous method of operation is retained at least for the safety control module 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A control apparatus for a fuel cell stack, said control apparatus comprising:

an operations control module, that is configured, in terms of program technology or circuit technology, to control a plurality of normal-operation-related sensor systems or actuator systems, wherein the normal-operation-related sensor systems or actuator systems relate to the operating state of the fuel cell stack during normal operation; and a safety control module, that is configured, in terms of program technology or circuit technology, to control safety-related sensor systems or actuator systems, wherein the safety-related sensor systems or actuator systems relate to the safety functions of the fuel cell stack;

wherein the safety control module is provided as an assembly which operates in an autonomous fashion with respect to the operations control module.

2. The control apparatus of claim 1, wherein the safety control module is configured to control most or all of the safety-related sensor systems or actuator systems of the fuel cell stack.

3. The control apparatus of claim 1, wherein the safety control module is configured to control the safety-related sensor systems or actuator systems even in the case of disrupted or faulty communication with other control modules.

4. The control apparatus of claim 1, wherein the safety control module is—an electronic safety system.

5. The control apparatus of claim 1, wherein the safety control module has interfaces for connecting sensors and actuators of the safety-related sensor systems or actuator systems.

6. The control apparatus of claim 5, wherein the interfaces are individually assigned to the sensors or actuators.

7. The control apparatus of claim 1, wherein the safety control module or the operations control module communicates with one another via a BUS system or with a central control unit that is configured to perform open-loop control of a mobile apparatus.

8. The control apparatus of claim 7, wherein communication between the safety-related sensor systems or actuator systems and the safety control module takes place independently of the BUS system.

9. The control apparatus of claim 1, wherein the safety-related sensor systems or actuator systems comprise at least one member selected from the group consisting of: Temperature sensors, pressure sensors, gas sensors, conductivity sensors, current sensors, voltage sensors, insulation measurement, safety loops, main contactors, valves, motors, fuses, semiconductor switches and relays.

10. The control apparatus of claim 1, wherein the safety control module is—a multi-microprocessor system with hardware circuits, and the operations control module is—a single microprocessor system.

11. A method of operating a fuel cell stack, said method comprising the steps of:

controlling a plurality of normal-operation-related sensor systems or actuator systems with an operations control module, wherein the normal-operation-related sensor systems or actuator systems relate to the operating state of the fuel cell stack during normal operation; and controlling a plurality of safety-related sensor systems or actuator systems with a safety control module, wherein the safety-related sensor systems or actuator systems relate to the safety functions of the fuel cell stack;

wherein the safety control module is configured to operate independently of the operations control module.

12. The method of claim 11, wherein the safety control module is configured to control the safety-related sensor systems or actuator systems even in the case of disrupted or faulty communication with any other control module.

13. The method of claim 11, wherein the safety control module is an electronic safety system.

14. The method of claim 11, wherein the safety control module interfaces with sensors and actuators of the safety-related sensor systems or actuator systems.

15. The method of claim 14, wherein the safety control module interfaces individually with each of the sensors and actuators of the safety-related sensor systems or actuator systems.

16. The method of claim 11, wherein in the safety control module or the operations control module communicates with one another via a BUS system or with a central control unit that is configured to perform open-loop control of a mobile apparatus.

17. The method of claim 11, wherein the safety-related sensor systems or actuator systems comprise at least one member selected from the group consisting of:

temperature sensors, pressure sensors, gas sensors, conductivity sensors, current sensors, voltage sensors, insulation measurement, safety loops, main contactors, valves, motors, fuses, semiconductor switches and relays.

18. The method of claim 11, wherein the safety control module is a multi-microprocessor system with hardware circuits, and the operations control module is a single microprocessor system.

* * * * *